(12) United States Patent  (10) Patent No.: US 8,801,445 B2
Byrne  (45) Date of Patent: Aug. 12, 2014

(54) VERTICAL T-JUNCTION BLOCK ASSEMBLY

(76) Inventor: Norman R. Byrne, Ada, MI (US)

( * ) Notice: Subject to any disclaimer, the term of this patent is extended or adjusted under 35 U.S.C. 154(b) by 0 days.

(21) Appl. No.: 12/834,452

(22) Filed: Jul. 12, 2010

(65) Prior Publication Data

US 2014/0057484 A1    Feb. 27, 2014

(51) Int. Cl.
H01R 4/60    (2006.01)

(52) U.S. Cl.
USPC .............................. 439/215; 439/654; 174/48

(58) Field of Classification Search
USPC ................................ 439/215, 654; 174/48, 49
See application file for complete search history.

(56) References Cited

U.S. PATENT DOCUMENTS

| | | | |
|---|---|---|---|
| 1,187,010 A | 6/1916 | Rodrigues | |
| 2,540,575 A | 2/1951 | Finizie | |
| 4,135,775 A | 1/1979 | Driscoll | |
| 4,382,648 A | 5/1983 | Propst | |
| 4,551,577 A | 11/1985 | Byrne | |
| 4,579,403 A | 4/1986 | Byrne | |
| 4,959,021 A | 9/1990 | Byrne | |
| 5,013,252 A | 5/1991 | Nienhuis | |
| 5,073,120 A | 12/1991 | Lincoln | |
| 5,096,431 A | 3/1992 | Byrne | |
| 5,096,433 A * | 3/1992 | Boundy | 439/215 |
| 5,096,434 A | 3/1992 | Byrne | |
| 5,104,332 A * | 4/1992 | McCoy | 439/290 |
| 5,131,860 A * | 7/1992 | Bogiel | 439/215 |
| 5,164,544 A | 11/1992 | Snodgrass | |
| 5,178,555 A | 1/1993 | Kilpatrick | |
| 5,259,787 A | 11/1993 | Byrne | |
| 6,652,288 B2 * | 11/2003 | Laukhuf et al. | 439/32 |
| 6,910,903 B2 * | 6/2005 | Kondas | 439/215 |
| 7,494,356 B2 * | 2/2009 | Byrne | 439/215 |
| 2005/0095890 A1 * | 5/2005 | Plattner et al. | 439/215 |
| 2007/0259548 A1 * | 11/2007 | Byrne | 439/215 |
| 2008/0254661 A1 * | 10/2008 | Byrne | 439/215 |
| 2009/0239403 A1 * | 9/2009 | Byrne | 439/215 |
| 2010/0184316 A1 * | 7/2010 | Byrne | 439/215 |

* cited by examiner

Primary Examiner — Gary Paumen
(74) Attorney, Agent, or Firm — Varnum, Riddering, Schmidt and Howlett LLP

(57) ABSTRACT

A vertical junction block assembly (200) is disclosed having a receptacle block region (214) extending through a lateral or front surface (212) of the assembly (200). An internal wiring assembly (226) connects a horizontal terminal group (229) to a vertical male terminal set (262) which extends upwardly through a vertical junction block terminal housing (244). A vertical cable assembly (280) having a vertical cable connector (284) is connectable to the vertical male terminal set (262).

13 Claims, 15 Drawing Sheets

VERTICAL T-JUNCTION BLOCK ASSEMBLY

CROSS-REFERENCE TO RELATED APPLICATIONS

Not applicable.

STATEMENT REGARDING FEDERALLY SPONSORED RESEARCH OR DEVELOPMENT

Not applicable

REFERENCE TO MICROFICHE APPENDIX

Not applicable.

BACKGROUND OF THE INVENTION

1. Field of the Invention

The invention relates to electrical power distribution systems and, more particularly, to systems having junction block assemblies and the requirement of providing vertically disposed electrical connections to at least some of the junction block assemblies.

2. Background Art

Known interior wall systems typically employ pre-fabricated modular units. These units are often joined together in various configurations, so as to divide a workplace into smaller offices or work areas. Generally, such modular wall panels may be equipped with means for receiving general building power and, possibly, general communications. Such building power may, for example, be conventional AC power received either under floor or from relatively permanent walls or the like. In various types of environments comprising electrical equipment, or wherein electrical apparatus are otherwise employed, interconnections of electrical components to incoming utility power are typically provided by means of cables or wires. For example, in office systems compromising modular furniture components, it is often necessary to provide electrical interconnections between incoming power supplies and various types of electrical devices typically used in an office environment, such as electric typewriters, lamps, etc. Computer-related devices, such as video display terminals and similar peripherals, are also now commonly employed in various office and industrial environments.

One advantage inherent in modular office systems is the capability to rearrange furniture components as necessitated by changes in space requirements, resulting from changes in the number of personnel and other business-related considerations. However, these modular systems must not only allow for change in furniture configurations, but also must provide for convenient interconnection of electrical devices to utility power, regardless of the spatial configuration of the modular systems and resultant variable distances between electrical devices.

In providing the interconnection of electrical apparatus and power inputs, it is necessary to include an arrangement for feeding the incoming utility power to the power outlets. In stationary structures, such as conventional industrial buildings and the like, a substantial amount of room would normally exist behind stationary walls and other areas in which to provide the requisite cabling for interconnecting incoming utility power to electrical receptacles mounted in the walls. Such systems, however, can be designed so as to remain stationary throughout their lifetime, without requiring general changes in the office or industrial environment areas.

In addition to receiving electrical power from the general incoming building power supply, modular office systems typically require communications connections for office equipment such as telephones, interne communications and the like. The problems associated with providing distribution of communications essentially correspond to the same problems existing with respect to distribution of conventional electrical power.

In this regard, it is known to provide modular wall panels with areas characterized as raceways. Often, these raceways are located along bottom edges of modular panels. The raceways are adapted to house electrical cabling and electrical junction blocks. The cabling and junction blocks are utilized to provide electrical outlets and electrical power connections to adjacent panels. However, it is also apparent that to the extent reference is made herein to providing electrical outlets and electrical power connections for adjacent panels, the same issues exist with respect to providing communications among panels.

Still further, it is known that the raceway of one modular wall unit may be provided with a male connector at one end, and a female connector at another end. Pairs of junction blocks, each provided with electrical outlets, made to be disposed at spaced-apart positions along the raceway. Conduits may be extended between the junction blocks and between the connectors in the junction blocks. In this manner, electrical interconnection is provided between the units.

The modular panels of a space-divider may be configured, such that adjacent panels are in a straight line, or at various angular positions relative to each other. It is common to configure intersecting walls in such a fashion that three or four modular wall panels may intersect at right angles. Each of the panels typically requires electrical outlets, and may require outlets on both sides of the panels. In any event, electrical power has to be provided to all of the panels, and often only one of the panels at the multiple panel junction is connected to a power supply source. Under such circumstances, the interconnecting wiring becomes a significant problem. That is, special modifications may have to be made to power systems of wall panels to be used in such a configuration. Because interchangeability of wall panels is highly desirable, custom modifications are preferably avoided. Still further, modifications of wall panels on site at the installation facility is complex and may be relatively expensive.

In addition to the foregoing issues, problems can arise with respect to the use of junction blocks and the amount of room which may exist within a raceway. That is, raceways require sufficient room so as to provide for junction blocks, electrical outlet receptacle blocks, and cabling extending between junction blocks and between adjacent panels.

One example of a prior art system is illustrated in Propst's, et al., U.S. Pat. No. 4,382,648 issued May 10, 1983. In the Propst, et al. system, mating connectors of opposing panels are engaged when the panels are aligned in a straight line. When the panels are positioned in an intersecting relationship, specially manufactured couplers are utilized. One type of special coupler is used when the panels are positioned at right angles. Another type is used with adjoining panels arranged at angles other than right angles. Consequently, costly inventory of couplers must be maintained. The Propst, et al. system uses a double set of connectors comprising a male and female connector for each conductor to be interconnected. When a single one of these prior art panels intersects two adjacent panels, one of the specially manufactured couplers connects the female terminals to one of the adjacent panels, and another of the couplers connects the male terminals to the adjacent panel.

A further system is disclosed in Driscoll, U.S. Pat. No. 4,135,775, issued Jan. 23, 1979. In the Driscoll system, each panel is provided with an electrical outlet box in its raceway. Panels of different widths are provided with a pair of female connectors. Outlet boxes of adjacent panels are interconnected by means of flexible cables having male connectors at both ends. When three or four panels are adjoined in an intersecting arrangement, two cables may be connected the pair of female connectors at one end of an outlet box. In this manner, connection of two adjacent panels is facilitated.

With respect to both of the foregoing systems, and other than in the special intersecting relationship, one half of the double set of terminals of these systems is superfluous. There is a distinct disadvantage in modern day systems, where several independent electrical circuits are needed in a wall panel system, with each requiring separate connectors. Space for such circuits and their connectors is very limited in the raceway areas of modern, thin-line wall panels.

Other systems also exist with respect to electrical connectors, junction boxes, and the like. For example, Rodrigues, U.S. Pat. No. 1,187,010 issued Jun. 13, 1916, discloses a detachable and interchangeable electrical switch plug adapted for use in connection with various electrically heated appliances. A clamping device is positioned in a fixed, but detachable relationship to one end of the plug. Means are provided to enclose and prevent sharp flexure of the cord comprising a flexible enclosing tube gripped under tension by the other end of the clamping device. The plug and the clamping device may be simultaneously removed from the socket.

Finizie, U.S. Pat. No. 2,540,575, issued Feb. 6, 1951, discloses a cord guide member for utensil plugs. The concept is to reduce wear on the cord and the connector plug, and to provide a connection which will withstand heavy pulling strains without injury. Strain relief is also provided. A sectional body is equipped anteriorally adjacent one end of the body with terminals. The other end of the body contains an anterior chamber or socket. A pivotable cord-guiding member having a pivot member is movably mounted in the socket. A wedge-shaped strain relief insert is received within a wedge-shaped recess in the pivot member. A cord extends into the pivot member and includes wires passing from the cord toward the terminals. The incoming portions of the wires are moved around the insert and firmly wedged within the recess.

Byrne, U.S. Pat. No. 4,551,577, issued Nov. 5, 1985, describes a retractable power center. The power center provides for conveniently located electrical power source receptacles adapted to be mounted on a work surface. In one embodiment, the power center includes a rectangular housing received within a slot in a work surface. A clamping arrangement is utilized to secure the housing to the work surface. A lower extrusion is connected to the lower portion of the housing. A movable power carriage mounts the receptacles and a catch assembly releasably maintains a carriage in a closed and retracted position. In response to manual activation, the catch assembly is released and springs tensioned between the carriage and the extrusion exert forces so as to extend the carriage upward into an extended, open position. In the open position, the user can energize the desired electrical devices from the receptacles, and then lower the carriage into the retracted position.

Byrne, U.S. Pat. No. 4,959,021, issued Sep. 25, 1990, discloses a pivotable power feed connector having a pivotal connector adapted to be connected to a flexible conduit or cable. The cable has a series of conductors extending there through. The connector is pivotably connected to a block assembly through which the conductors extend. The block assembly, in turn, is connectable to a contact block, with the conductors conductively connected to a set of prong terminals extending outwardly from the block. A cover is secured over the block so as to prevent the prong terminals from being exposed during assembly and disassembly.

The cover automatically exposes the prong terminals as the power feed connector is moved into engagement with a receptacle in a modular office panel. The connector allows the conduit or cable to be swiveled to an arc of approximately 180 degrees to any desired position. The connector is also manually removable from interconnection with the block assembly. Such removal allows the conduit or cable to be pulled back from the conductors and cut to a desired length. The connector includes a power feed cover which can be utilized in part to maintain the connector in either of two spatial configurations relative to the block assembly.

Nienhuis, et al., U.S. Pat. No. 5,013,252, issued May 7, 1991, discloses an electrified wall panel system having a power distribution server located within a wall panel unit. The server includes four receptacle module ports oriented in an h-shaped configuration. A first receptacle port is located on the first side of the wall panel unit and opens toward a first end of the unit. A second receptacle unit is also located on the first side of the wall panel unit, and opens toward a second end of the wall panel unit. A third receptacle port and a second sided wall panel unit opens toward the first end of the wall panel unit, while correspondingly, a fourth receptacle port on the second side of the wall panel unit opens toward the second end of the wall panel unit. First and second harnesses are each electrically connected at first ends thereof to the power distribution server. They extend to opposite ends of the wall paneled unit and include connector ports on the second ends thereof for providing electrical interconnection of adjacent wall panel units. The Nienhuis, et al. patent also discloses a system with a wall panel connector interchangeably usable with the interconnection of two, three or four units. The connector includes a hook member for connecting together adjacent vertical members of frames of adjacent wall panel units at a lower portion thereof. A draw naught for connecting together adjacent vertical members of frames of adjacent wall panel units and an odd proportion thereof is provided by vertical displacement thereof.

Lincoln, et al. U.S. Pat. No. 5,073,120, issued Dec. 17, 1991, discloses a power distribution assembly having a bussing distribution connector. The connector includes a series of bus terminals positioned within an electrically insulative housing. A series of electrical terminals are positioned in the housing for distributing more than one electrical circuit. At least one ground terminal, one neutral terminal, and three hot terminals are provided. A grounding shell partially surrounds the bus connector and includes a grounding tab grounding the one ground terminal to the metallic grounding shell. In another embodiment, two bus connectors are interconnected together, so as to provide for an increased number of output ports.

Byrne, U.S. Pat. No. 5,096,431, issued Mar. 17, 1992, discloses an outlet receptacle with rearrangeable terminals. The receptacle is provided with input terminals to selected positions, for engagement with terminals of an electrical junction block. The block includes a series of terminals representing a plurality of different electrical circuits. The receptacle block has neutral, ground and positive flexible positive conductor bars electrically connected to neutral, ground and positive electrical terminals. Input terminals of the block are formed integral with the flexible conductor bars and levers are provided for moving the terminal ends of the conductor bars to physically different positions. In one configuration, the receptacle block housing is provided with openings at opposing ends, and the flexible conductor bars have terminal ends controlled by levers at both ends of the outlet receptacle block. In another configuration, the block has output terminals in a front wall, and the input terminals of the receptacle block are formed as ends of the flexible bars and extend at an approximately 90 degree angle to the bars. They further send through openings in the back wall of the outlet receptacle for engagement with terminals of a junction block. Levers are provided in the back wall of the receptacle block for positioning the terminal ends in alignment with different terminals of the junction block, and windowed openings in the front wall expose indices on the levers identifying selected circuits.

Byrne, U.S. Pat. No. 5,096,434, issued Mar. 17, 1992, discloses an electrical interconnection assembly for use in wall panels of a space divider wall system. The system includes junction blocks having several receptacle connectors, so as to provide a plurality of electrical outlets on both sides of a wall panel. The junction block is connected by means of conduits extending from both ends of the junction block to oppositely directed connector blocks for connection to adjoining panels. The assembly of the junction block and connector blocks allows electrical power to be supplied to one end of the panel and conducted to and through the junction block to other panels. The receptacle connectors on the junction block each have one type of terminal configuration, e.g., a female electrical terminal configuration. One of the connector blocks is provided with the identical terminal configuration. The other connector block is provided with a matching terminal configuration, e.g., a male electrical terminal configuration. When two wall panels are joined at their respective edges, the male connector block may be readily connected to the female connector block in the adjacent panel. When two panels are joined to a third panel, all at one point, the arrangement of this invention allows the male connector block to be connected to the female connector block of one of the other two panels, and the male connector of the other of the two panels may be connected to one of the receptacle connectors of the junction block on either of the other two panels, in this manner establishing a three way interconnection arrangement. In a similar fashion, a fourth, or other additional panels may be added to the junction and plug into receptacle outlets of other panels in order to provide an arrangement of panels that is totally interconnected, electrically.

Snodgrass, et al., U.S. Pat. No. 5,164,544, issued Nov. 17, 1992, describes an electrified space dividing panel having a panel member, raceway, modular, or electric system disposed in a raceway and raceway covers for gaining access to the system. The system includes a single terminal block having end and side sockets, with first and second electrical receptacles being respectively removeably engaged with the end socket and the side sockets, such that the first and second electrical receptacles are disposed in horizontally spaced, side-by-side relation and project outwardly for predetermined light dimensions through receptacle openings in one of the raceway covers. The raceway can include a web having an opening which cooperates with a support ear on the first receptacle during engagement of the first receptacle with an end socket, so as to provide additional lateral support for the electrical receptacle when a plug is removed there from.

Kilpatrick, et al., U.S. Pat. No. 5,178,555, discloses a kit which includes a junction box for installation along a raceway. The kit includes a mounting bracket having a first adjustable mounting mechanism for locating the bracket along the raceway. This provides an initial adjustment, and a second adjustable mounting mechanism is provided for securing the junction box to the mounting bracket. This adjustably locates the junction box along the mounting bracket, and provides a second or final adjustment to accurately locate the junction box between two pre-measured lengths of cable.

Byrne, U.S. Pat. No. 5,259,787, issued Nov. 9, 1993, discloses an electrical junction block mounting assembly, which may be utilized for mounting the junction block within a raceway. The assembly includes a cantilever beam formed on an outer wall of the junction block. This beam is provided with a transversely extending channel for engagement with a support structure. The beam is attached to the junction block by means of a resilient hinge section, and is provided with a first arm section extending between the hinge section and the channel, and a second arm section extending beyond the channel. The first arm section has a sloping surface sloping away from the outer channel between the hinge section of the panel. The second armed section has a sloping surface sloping toward the wall beyond the channel. The surfaces will contact a mounting rail or similar structure during installation of the junction block. In this manner, the hinged cantilever beam is deflected until the rail is in alignment with the channel for engagement with the structural support member.

One issue which exists with respect to power distribution systems for use in raceways and other configurations relates to directional connections of interconnected power and jumper cable assemblies. That is, in a power distribution system, whether used within a raceway of an office panel, or in a "stand alone" configuration, the distribution system may advantageously require electrical connections not only within a substantially horizontal plane, but also vertically disposed connections. However, known junction block assemblies utilized in known distribution systems are not known to include such an activity capability.

BRIEF DESCRIPTION OF THE DRAWINGS

The invention will now be described with reference to the drawings, in which.

DESCRIPTION OF THE PREFERRED EMBODIMENT

The principles of the invention are disclosed, by way of example, in a vertical T-junction block assembly as illustrated in several embodiments shown in FIGS. 9-29. For purposes of brevity and description, the vertical T-junction block assemblies will be described herein with alternative terms, such as "vertical junction block assembly" and "junction block assembly." These vertical junction block assemblies advantageously provides the capability of electrically engaging an electrical outlet receptacle block within a junction block, and also provide the capability of an electrical interconnection with a cable assembly (which can be in the form of a jumper cable assembly or a cable assembly having active electrical components, such as another junction block assembly) disposed in a vertical direction. This capability of vertical interconnection is provided along with the capability of horizontally disposed electrical interconnections to separate cable assemblies.

For purposes of describing power distribution configurations where vertical junction block assemblies in accordance with the invention may be utilized, the following paragraphs describe prior art electrical interconnection assemblies which could be adapted for use within wall panels of a space divider wall system. These assemblies are shown in the prior art drawings of FIGS. 1-8. Specifically, FIGS. 1-8 describe and depict a junction block with several receptacle connectors, so as to accommodate a series of electrical outlets on both sides of a wall panel. The junction block is connected by means of conduits extending from both ends of the junction block to associated connector blocks for connection to adjoining panels. Following the description of the prior art electrical interconnection assemblies, the vertical junction block assemblies in accordance with the invention will be described with respect to FIGS. 9-29.

Figure 1:
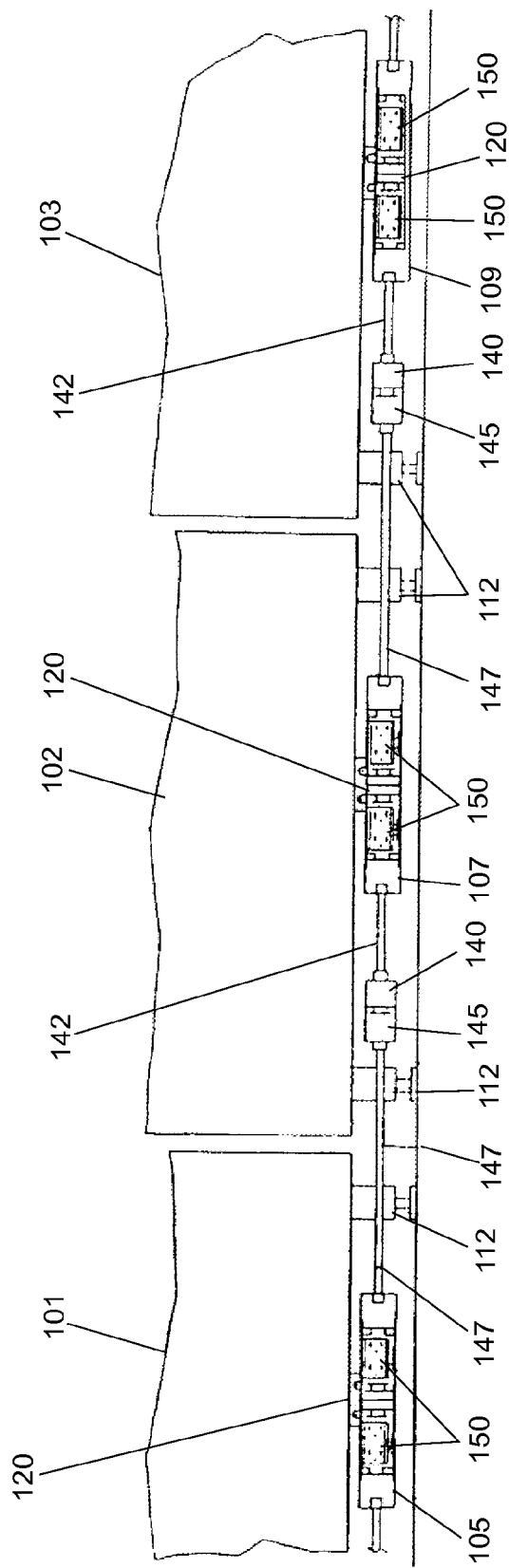
FIG. 1 is a prior art, fragmentary elevation view of a plurality of adjacent wall panels and electrical connection assemblies arranged in the panels.

FIG. 1 is a prior art fragmentary elevational view of adjacent modular wall panels 101, 102, 103 of a rearrangeable wall system. The wall panels are provided with electrical interconnection assemblies 105, 107 and 109 in a raceway area formed along the lower edge of panels 101, 102 and 103. Each of the panels is provided with substantially flat support legs 112 which allow for passage of electrical conduits in the raceway. Raceway covers, customarily used, have been omitted from the drawing in FIG. 1 to better show the electrical junction assemblies. Each of the electrical interconnection assemblies 105, 107, and 109 is provided with a junction block 120, a female electrical connector block 140 and a matching male connector block 145. The connector blocks 140, 145 are connected to associated junction blocks 120 by means of conduit sections 142 and 147, respectively. Each of the junction blocks 120 is shown in FIG. 1 to be provided with a pair of electrical outlet receptacles 150. Junction blocks 120 are double sided and corresponding pairs or outlet receptacles are provided on the opposite side of each of the wall panels 101, 102 and 103 (not shown in the drawing) to allow various electrical equipments to be plugged into the outlets from either side of the panel.

Figure 2:
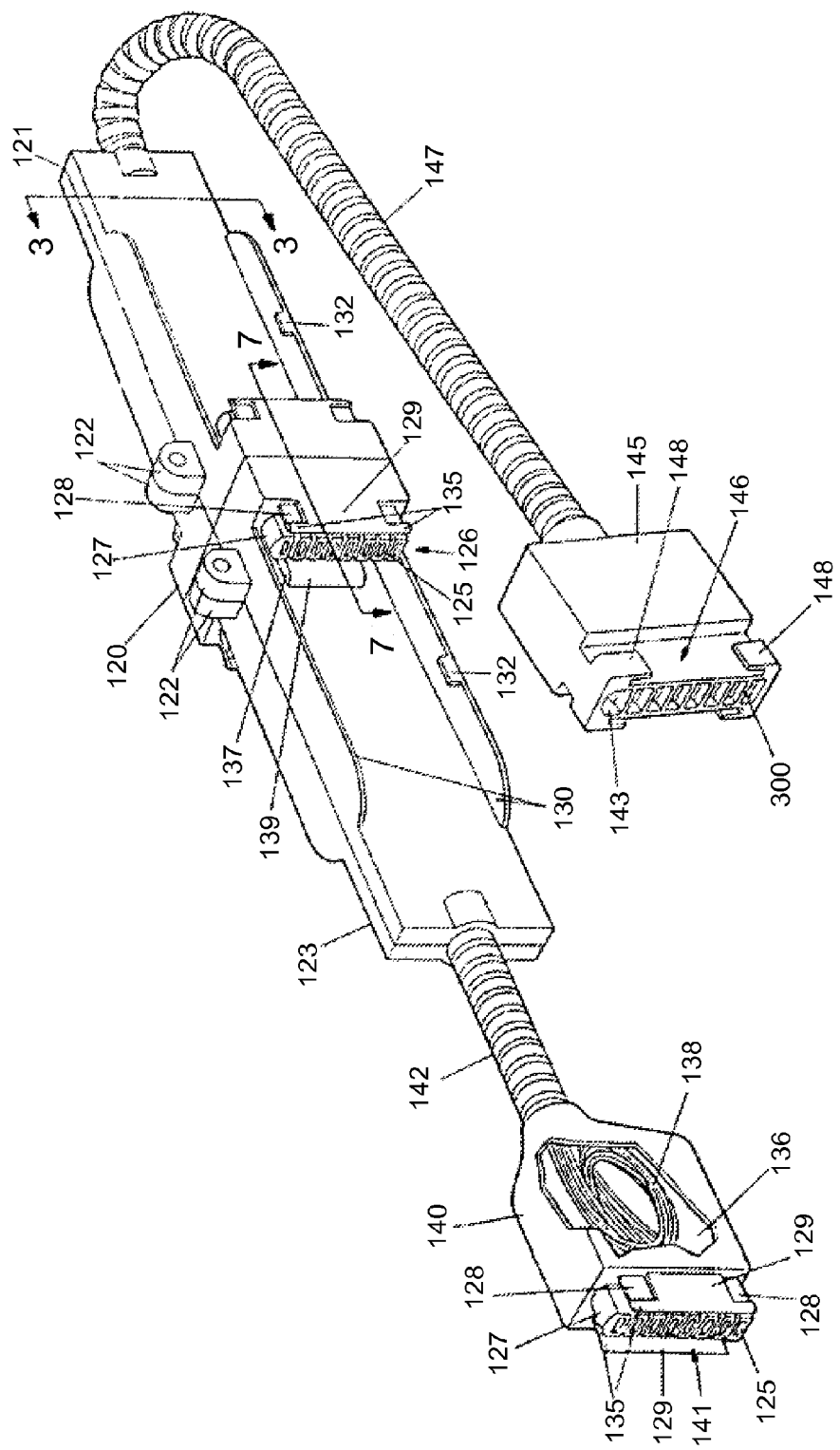
FIG. 2 is a prior art, enlarged perspective view of one of the electrical interconnection assemblies of FIG. 1.

FIG. 2 is an enlarged perspective view of one of the electrical interconnection assemblies, for example assembly 107. The junction block 120 is provided with support lugs 122 by which the junction block is supported by standard fasteners extended through support tables extending from the bottom edge of the wall panel, e.g., wall panel 102. Junction block 120 comprises an elongated housing having opposing ends 121 and 123 and a symmetrical center section comprising four female receptacle connectors 126. Only one of the receptacle connectors 126 is fully exposed in FIG. 2. There is a pair of connectors 126 on each side of the housing and the connection on each side face in opposite directions. Support flanges 130 are provided adjacent each of the female connectors to provide support for electrical outlet receptacles engaged with the connectors 126. In this manner, junction block 120 is adapted to support four electrical outlet receptacles, two on each side of a wall panel to which junction block 120 is attached. The junction block assembly further comprises end connector block 140, provided with a female connector 141, and connected via a standard electrical conduit 142, which may be a flexible conduit, to end 123 of junction block 120. Similarly, connector block 145, provided with a male connector 146 is connected via flexible conduit 147 to end 121 of junction block 120. In a straight line connection arrangement, as depicted for example in FIG. 1, wherein a plurality of panels are positioned adjacent each other, electrical power is transmitted between panels by connection of male connector block 145 to female connector block 140 of the adjacent junction assembly.

Electrical power is transmitted through the junction assembly by means of electrical wires disposed in the conduits 142, 147, terminated on connectors 141 and 146, respectively, and connected to receptacle connectors 126 in junction block 120. Accordingly, electrical power is transmitted through interconnecting panels and is at the same time made available at electrical outlet receptacles in each panel. Conduit 147, provided with the male connector block 145, may be a fixed-length conduit and conduit 142 may be of a length such that female connector block 140 is positioned at substantially the same distance from the panel edge in each panel independent of the width of the panel. Thus, female connector block 140 will always be accessible to male connector block 145 independent of the width of the panels. To accommodate panels of different widths, conduit 142 may be an expandable flexible conduit, such as are well known in the art. In that case, connector block 140 may be provided with an inner spatial area 136, as shown in a partially broken-away view in FIG. 2. The inner spatial area 136 is provided for storage of excess length of electrical wiring 138 in a coiled or other configuration. The excess length of electrical wiring 138 may be withdrawn when conduit 142 is expanded to an extended length. This arrangement is similar to that disclosed in my earlier patent, U.S. Pat. No. 4,579,403 (dated Apr. 1, 1986) and entitled ELECTRICAL JUNCTION ASSEMBLY WITH ADJUSTABLE CONNECTORS.

Figure 4:
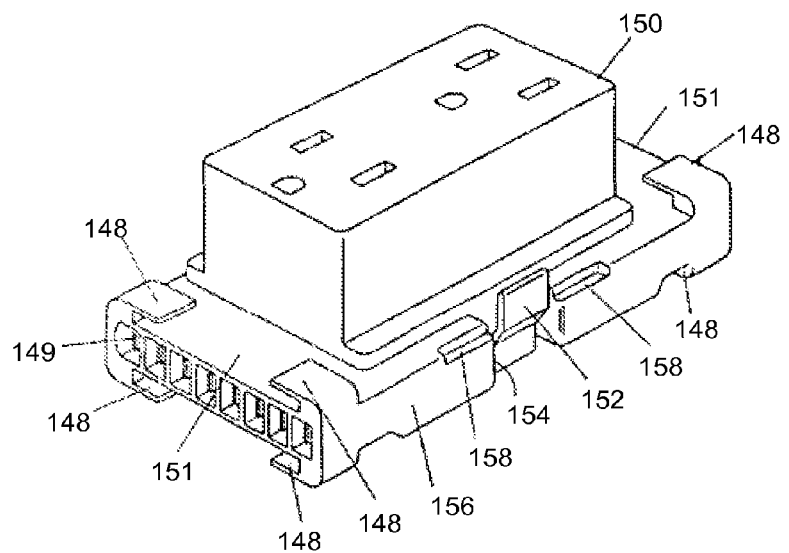
FIG. 4 is a prior art, enlarged perspective view of an outlet receptacle shown in FIG. 1.

The conduit 147 is preferably a flexible conduit which may be bent to accommodate a connection to adjacent panels which are disposed at angular positions with respect to each other, rather than in a straight line. The junction assemblies of this invention readily accommodate an arrangement in which three or more panels are disposed in an intersecting relationship, as will be discussed further herein with respect to FIG. 6. In such a configuration, the male connector block 145 of one of the panels may be connected to one of the female receptacle connectors 126 of a junction block assembly in an adjacent wall panel. For this purpose, the female connector 141 of connector block 140 and female receptacle connectors 126 on junction block 120 have been made identical. Similarly, the male connector 146 on connector block 145 has been made identical to the male connector of electrical outlet receptacle 150, shown in FIG. 1. Greater detail of the receptacle 150 is shown in FIG. 4 and is described below. As may be seen from FIG. 2, the female connectors 126 and 141 are each provided with a pair of side flanges 129 having upper and lower recessed areas 128, for engagement with flanges 148 of a male connector to provide a locking arrangement. FIG. 129, which are made of a resilient plastic material and formed integral to the housing to which they are connected, are provided with an outwardly extending inclined end surface 135. When surfaces 135 are engaged by flanges such as flanges 148 of connector 146 on connector block 145, the flanges 129 will be deflected inward, allowing flanges 148 of the male connector to engage recesses 128 to provide a locking engagement of the male and the female connectors. A protuberance 137 is provided with a generally rounded edge surface 139 and acts as an entry guide as a male connector is engaged in female connector 126. The female connectors 126, 141 are each provided with a plurality of female connector terminals 125 and a key lug 127. Male connector 146 is provided with a plurality of male connector terminals 149 and an opening 143 for receiving key lug 127.

Figure 5:
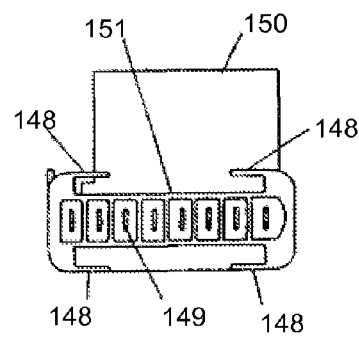
FIG. 5 is a prior art side elevation view of the outlet receptacle of FIG. 4.

The electrical outlet receptacle 150, shown in FIG. 4, is provided with male connectors 151 at both ends, allowing the receptacle to be plugged into any one of the four female receptacle connectors 126 of junction block 120. As shown in FIG. 2, junction block 120 is provided with upper and lower support flanges 130 to support receptacles 150 in each of the four female connectors 126. The lower support flanges 130 are provided with a locking flange 132. The receptacle 150 is provided with a spring latch 152 disposed in recess 154 in the surface 156 of receptacle 150. Surface 156 engages one of the lower support flanges 130 when the receptacle 150 is installed in the junction block 120. The locking flanges 132 will be aligned with the recess 154 when the receptacle 150 is inserted between flanges 130, causing the spring latch 152 to be depressed. The receptacle 150 may then be moved to either the left or to the right to engage one of the female connectors 126. Recesses 158 are provided in receptacle 150 to accommodate locking flange 132 and movement to either the left or to the right by a sufficient distance will cause the spring latch 152 to be moved past locking flange 132, causing the spring latch 152 to return to its extended position. Hence, receptacle 150 will be retained in a locked position. The receptacle may be removed by depressing spring latch 152 and sliding the receptacle 150 to either left or right to align the locking flange 132 with recess 154. FIG. 5 is a right-hand elevation of receptacle 150 showing a right-hand elevation or receptacle 150 showing right-hand male connector 151.

Figure 3:
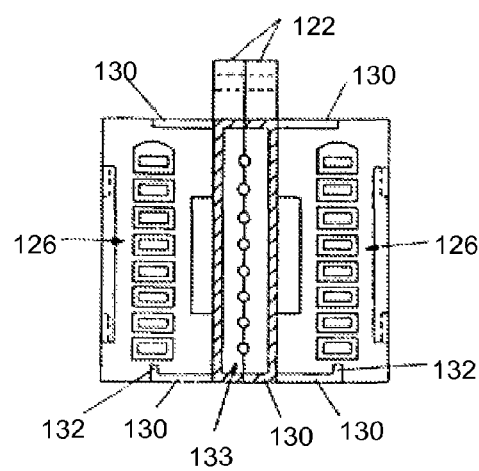
FIG. 3 is a prior art cross-sectional view taken along lines 3-3 of FIG. 2.

FIG. 3 is a cross-sectional view of junction block 120 taken along line 3-3 of FIG. 2. FIG. 3 shows two of the four receptacle connectors 126 of connector block 120. One of the two connectors 126 shown in FIG. 3 is disposed on each side of the central housing section 131, which contains a plurality of wires 133. An eight-wire system is shown in this illustrative embodiment. Each of the male and female connectors are provided with eight separate terminals, and eight separate electrical wires 133 extend through the connector blocks 140, 145, the conduits 142, 147 and the central section 131 of the junction block 120. By way of example, these may include two ground terminal wires, three neutral wires and three positive wires representing three separate circuits, with a shared ground for two of the circuits. Similarly, 10- or 12-wire systems may be readily accommodated, having corresponding number of terminals on each of the connectors and providing a greater number of separate circuits. The four female receptacle connectors 126 are each connected to the wires 133 by means of a plurality of contact blades, described later herein with respect to FIGS. 7 and 8. Each wire, together with the connector block terminals and receptacle connector terminals to which it is connected, is referred to herein as a circuit element. A particular circuit may be selected for use by one of the receptacles 150 by appropriate wiring connections internal to the receptacle. Since all of the circuits are connected to each one of the receptacle connectors 126 of junction block 120, a connector block 145 of an adjacent panel, equipped with a male connector, may be connected to any one of the receptacle connectors 126. In this manner, electrical power may be provided to receptacle connectors to junction block 120 and to associated connector blocks 140, 145 and hence to any adjacent panels to which these connectors may be connected. Similarly, a connector block 145 equipped with a male connector connected to one of the female connectors 126 may receive electrical power for distribution to a panel to which the connector block 145 belongs. Such interconnecting arrangements are described further herein with respect to FIG. 6.

Figure 7:
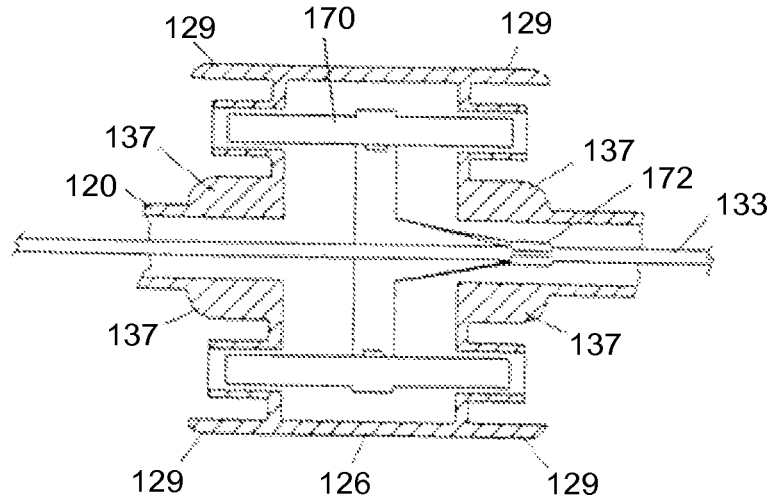
FIG. 7 is a prior art, fragmentary cross-sectional view taken along lines 7-7 of FIG. 2.
Figure 8:
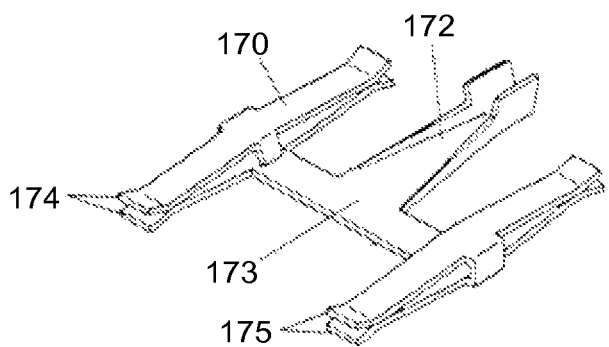
FIG. 8 is a prior art, perspective view of a receptacle contact blade shown in FIG. 7.
Figure 9:
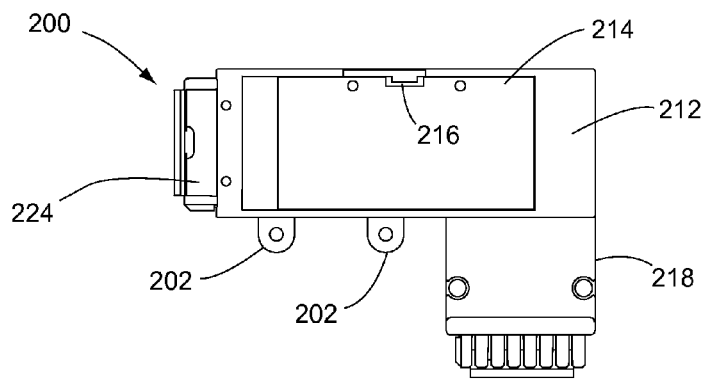
FIG. 9 is an inverted front elevation view of a vertical junction block assembly in accordance with the invention.
Figure 10:
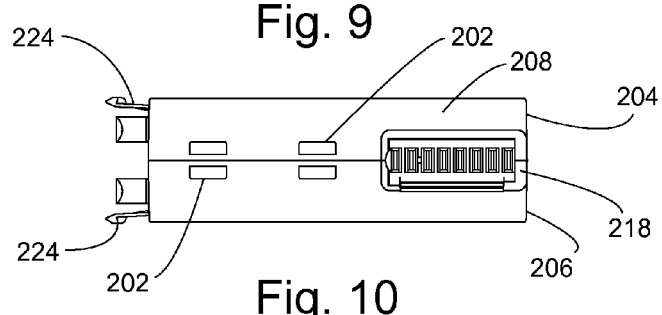
FIG. 10 is a plan view of the junction block assembly shown in FIG. 9.
Figures 11, 12, 13:
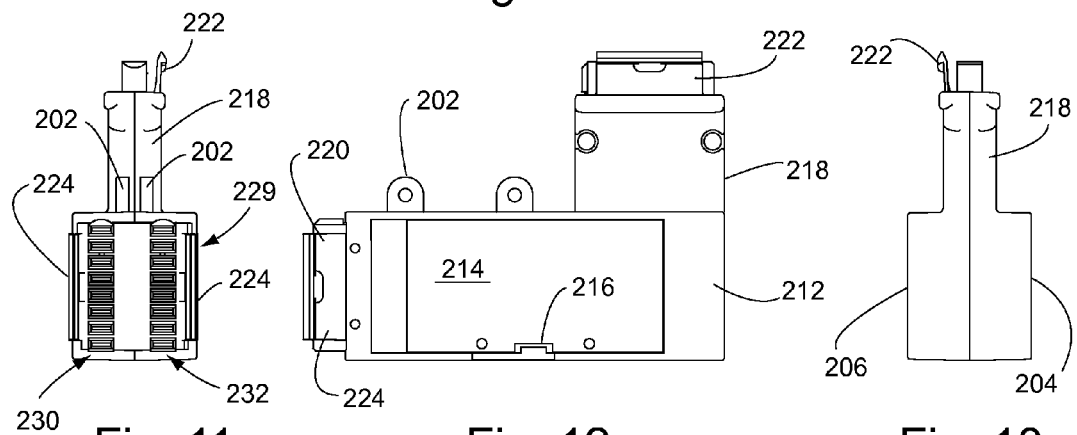
FIG. 11 is a left-side end view of the junction block assembly shown in FIG. 9.
FIG. 12 is a front elevation view of the junction block assembly shown in FIG. 9.
FIG. 13 is a right-side end view of the junction block assembly shown in FIG. 9.
Figure 14:
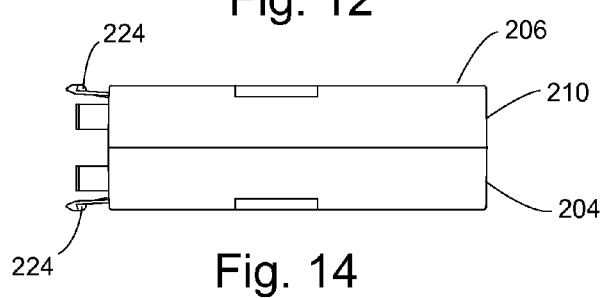
FIG. 14 is underside view of the junction block assembly in FIG. 9.

FIG. 7 is a fragmentary cross-sectional view along line 7-7 of FIG. 2. Shown in FIG. 7 is a contact blade structure 170 which is one of eight such blades disposed in central housing section 131. Each such blade is in electrical contact with one of the conductors 133. Connection to conductor 133 is made by means of a crimped connection of blade extension member 172 to conductor 133. As may be more readily seen from the perspective view of FIG. 8, the extension member 172 is part of a center section 173 which is connected to left-hand upper and lower contact blades 174 and right-hand upper and lower contact blades 175. The upper and lower contact blades on each side from the female opening part of the conductor 126 for engagement with blades of a male connector.

Figure 6:
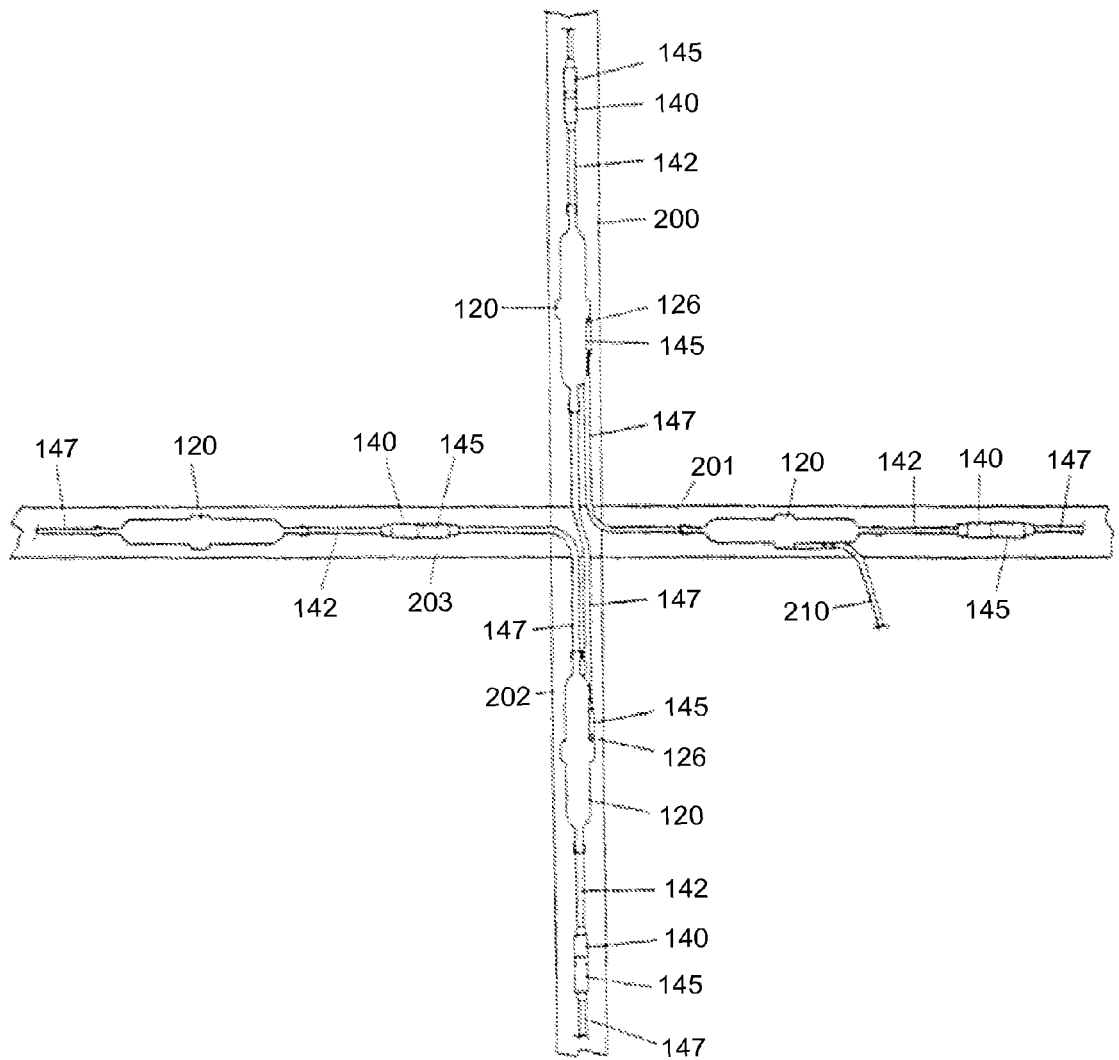
FIG. 6 is a prior art, fragmentary plan view of raceway areas of four wall panels, illustrating wall panel interconnections.

FIG. 6 is a fragmentary plan view of raceway areas of four wall panels illustrating the connections of interconnection assemblies of the invention in a configuration in which the four panels are disposed at right angles to each other. As will be apparent from the following description, the specific angle at which the panels are positioned is not particularly significant. Each of the four panels is provided with an interconnection assembly, as shown in FIG. 2, comprising a junction block 120, a male connector block 145, and a female connector block 140 attached to the junction block 120 by means of flexible conduits 147 and 142, respectively. The junction block 120 is disposed within each panel raceway near one edge of the panel. Panels 200, 201, 202 are positioned such that the end at which these panels are joined to other panels is the end near which the junction block 120 is positioned. One of the panels, panel 203, is positioned with an opposite orientation in which the end near which the junction block 120 is located is positioned opposite the point of junction of the four panels. The flexible conduit 147, provided with the male connector block 145, extends beyond the end of the panel in which it is positioned, and the flexible conduit 142, provided with a female connector block 140, is terminated just short of the end of the panel.

Thus, as is also shown in FIG. 1, a connection is made between panels by extending the flexible conduit 147 with male connector block 145 into the raceway area of the adjacent panel to engage the female connector block 140 at the end of flexible conduit 142. In the configuration of FIG. 6, the male connector block 145 of panel 202 and its associated flexible conduit 147 extend into the raceway area of panel 202 to engage female connector block 140 of panel 203. It will be apparent that the connection as shown between panel 202 and 203 may be made whenever these panels are adjacent and independent of the angle at which the panels are disposed with respect to each other. In the configuration of FIG. 6, the flexible conduit 147, with its male connector block 145, associated with the panel 200 are extended into the raceway area of panel 202 for engagement with one of the female receptacle connectors 126 of junction block 120 in panel 202. In this manner, an electrical connection is established among the junction blocks of the three panels 200, 202, and 203. Thus, electrical power provided from an external source to any one of these three may be distributed to the other two by means of the connection arrangement shown by way of example in FIG. 6. In the arrangement of FIG. 6, flexible conduit 147 and its male connector block 145 of panel 202 is connected to one of the female connectors 126 of junction block 120 of panel 200 thereby establishing an electrical connection between panels 200 and 201. This connection, in combination with the other connections shown in FIG. 6 and described in the previous sentences, completes an arrangement for establishing an electrical connection from any one of four panels to the entire four-panel configuration. Additional connections may be envisioned by connections of male connectors 145 from other panels into additional ones of the female receptacle connectors 126 of the junction blocks 120 of any of the panels 201 through 203, should one choose to provide an arrangement of more than four intersecting panels. Furthermore, additional conduits, such as conduit 210 shown in FIG. 6, may be connected by means of a male connector to any of the receptacle connectors 126 to provide electrical power to lamps or other fixtures.

The principles of the invention will now be described with respect to the vertical junction block assembly 200 and other embodiments of vertical junction block assemblies as illustrated in FIGS. 9-29. Turning first to FIGS. 9-14, the vertical junction block assembly 200 is adapted to provide for both horizontal cable assembly connections and vertically disposed cable assembly connections. As shown in FIGS. 9-14, the vertical junction block assembly 200 includes two pairs of upwardly extending support lugs 202. The support lugs 202 are known in the art and provide a means for connecting the vertical junction block assembly 200 to a raceway bracket or the like. The junction block assembly 200 is constructed of a rear housing half 202 and a front housing half 206. The housing halves 206 for a top surface 208 and a bottom surface 210. Further, the housing halves 204, 206 form a front surface 212.

In addition to the foregoing elements, the junction block assembly 200 also includes at least one receptacle block region 214 which extends inwardly through a lateral face or front surface 212. If desired, the junction block assembly 200 can also include a similar receptacle block region 214 which extends through an opposing lateral face of the block assembly 200. The receptacle block regions 214 provide an area for mechanically and electrically receiving receptacle blocks as described in subsequent paragraphs herein. For purposes of securing the receptacle blocks to the junction block assembly 200 in a releasable manner, receptacle block latches 216 may be utilized. On of the receptacle block latches 216 is shown in FIG. 212. These latches are known in the art.

As further shown in several of the views of FIGS. 9-14, the junction block assembly 200 also includes a vertically disposed connector housing 218. Correspondingly, the junction block assembly 200 includes a horizontal connector housing 220. The connector housings 218, 220 provide an area for housing terminal sets of the junction block assembly 200 as described in subsequent paragraphs herein.

For purposes of securing a connector assembly to the vertical connector housing 218, a vertical latch 222 is utilized. The vertical latch 222 is known in the art and has been utilized in other junction block assembly systems. In addition to the vertical latch 222, the junction block assembly 200 also includes a pair of horizontal latches 224, primarily shown in FIGS. 9, 10, 12 and 14. The horizontal latches 224, like the vertical latch 222, are utilized to releasably and mechanically secure a horizontal cable assembly connector to the horizontal connector housing 220.

Figure 15:
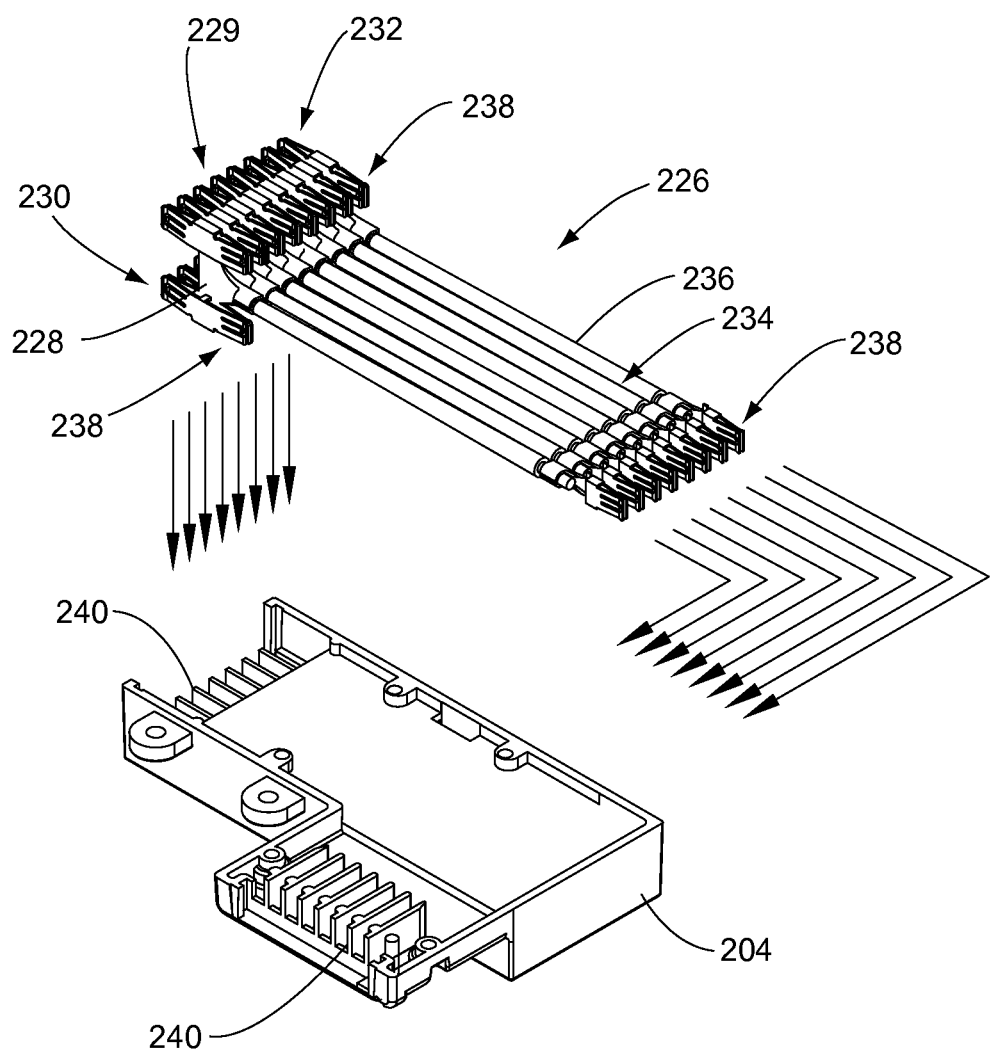
FIG. 15 is a perspective, partial and exploded view of the junction block assembly shown in FIG. 9, and further showing an internal wiring assembly positional for insertion into the mirror housing.

As shown specifically in the exploded view of FIG. 15, the vertical junction block assembly 200 also includes an internal wiring assembly 226. The internal wiring assembly 226 is utilized to electrically transmit power between the horizontal connector housing 220 and the vertical connector housing 218. Also, the wiring assembly 226 is utilized to selectively transmit power from external sources to receptacle blocks which are mechanically and electrically received within the receptacle block regions 214. Turning specifically to the wiring assembly 226 shown in FIG. 15, the assembly includes a series of H-connectors 228. The H-connectors 228 form a horizontal female terminal group 229. The female terminal group 229 comprises a first female terminal set 30 and a second female terminal set 232. Extending inwardly as part of the first female terminal set 230 is a junction block receptacle terminal group 298, again consisting of female terminals. Another junction block receptacle terminal group 298 extends inwardly from the first female terminal set 230. The junction block receptacle terminal groups 298 are positioned so as to receive corresponding male terminal groups of receptacle blocks, when the receptacle blocks are inserted within the receptacle block regions 214.

The internal wiring assembly 226 further includes an internal sheathed wire set 234, comprising a set of internal sheathed wires 236. The wires 236 are connected at one end to a vertical female terminal set 238. At the other end, the internal sheathed wires 236 are connected to the series of H-connectors 228 and horizontal female terminal group 229. As shown particularly in FIG. 16, when the junction block assembly block 200 is assembled, the terminal sets 230, 232 and 238 all rest within terminal slots 240, again as shown in FIGS. 15 and 16.

Figure 16:
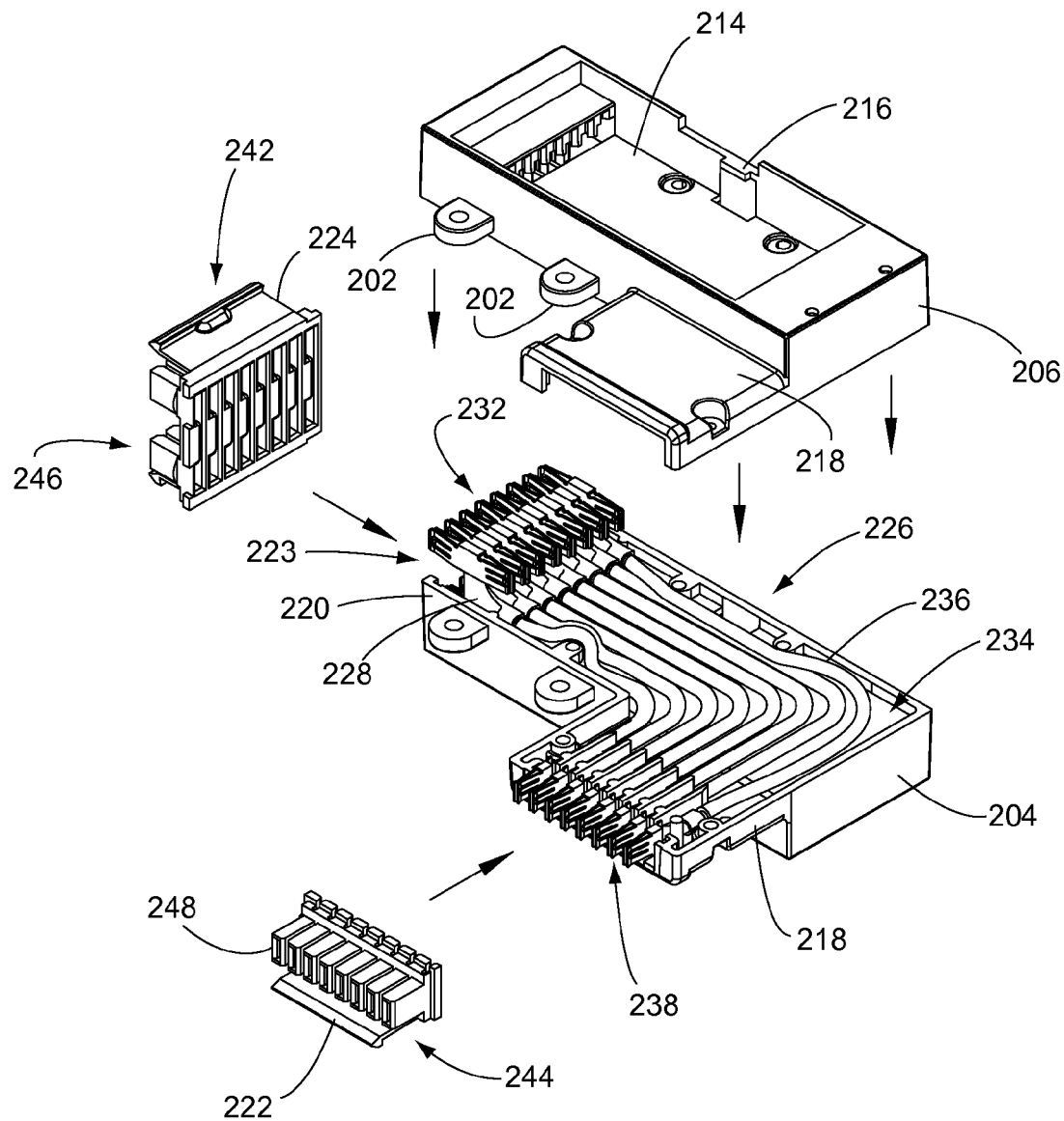
FIG. 16 is a perspective and exploded view of the junction block shown in FIG. 9 and showing the mirror housing, shown in FIG. 16, internal wiring assembly also shown in FIG. 16, along with a front housing, vertical junction block connector and horizontal junction block connector.
Figure 17:
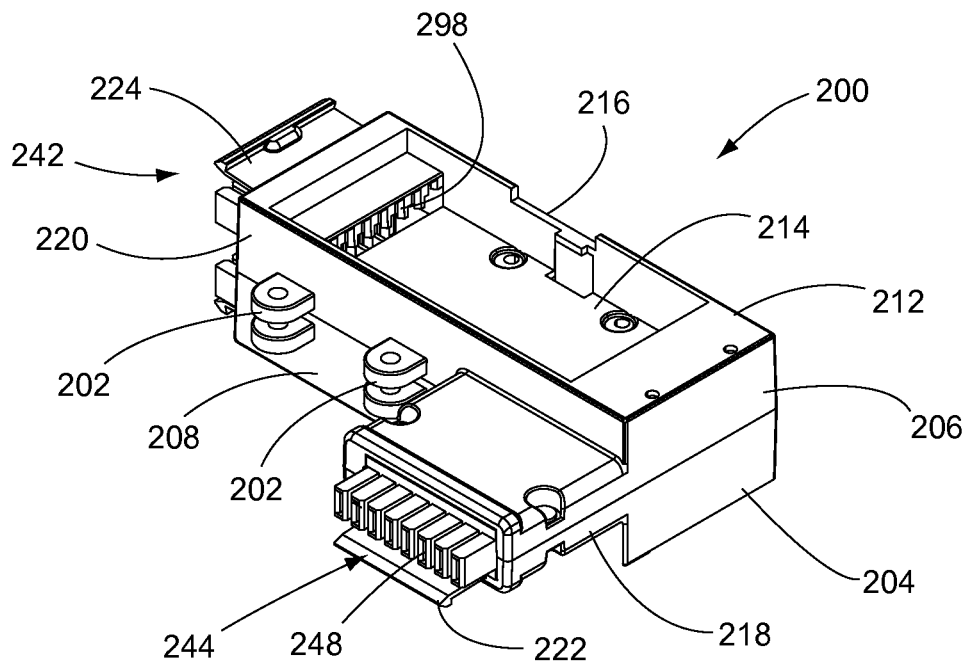
FIG. 17 is a perspective view of the fully assembled vertical junction block assembly shown in FIG. 9.
Figure 18:
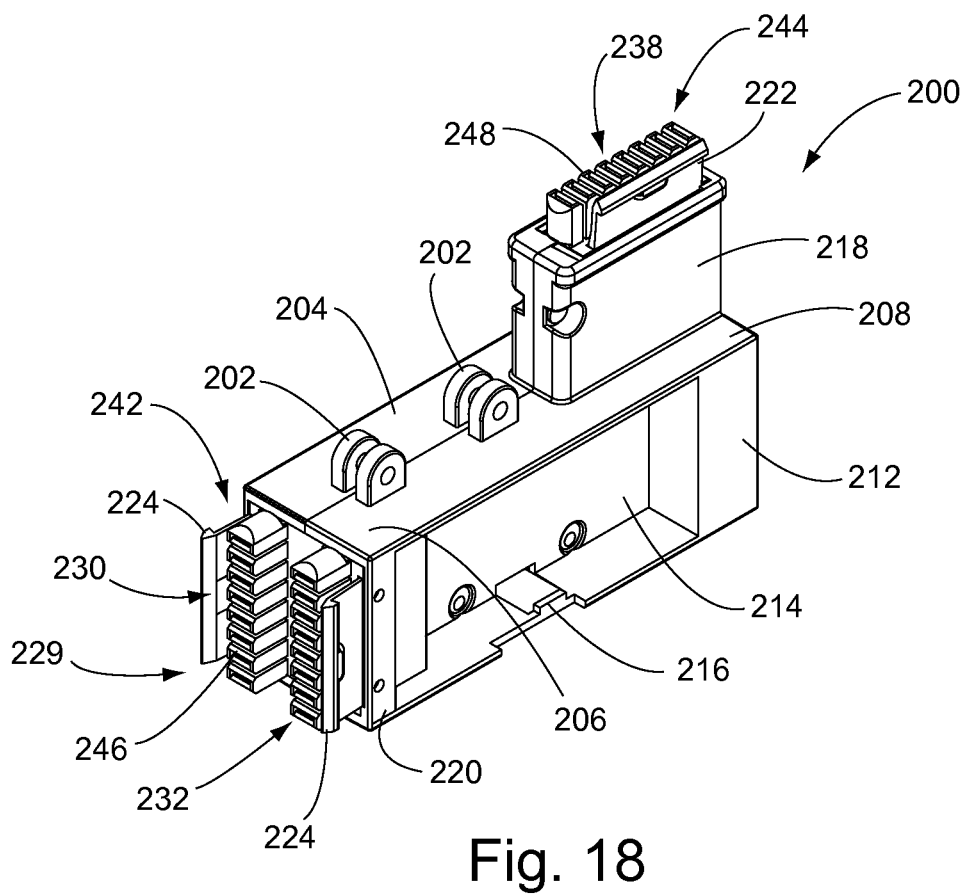
FIG. 18 is a perspective view, similar to FIG. 17, of the junction block assembly shown in FIG. 9, but showing a perspective from view from a different angle relative to FIG. 17.

In addition to the internal wiring assembly 226, the junction block assembly 200 also includes a horizontal junction block terminal housing 242, as specifically shown in FIG. 16. The horizontal terminal housing 242 is utilized to house the horizontal female terminal group 229. In addition to the horizontal junction block terminal housing 242, the junction block assembly 200 also includes a vertical junction block terminal housing 244, for housing the vertical female terminal set 238. Still further, the horizontal junction block terminal housing 242 includes a set of horizontal terminal slots 246, while the vertical junction block terminal housing 244 includes a set of vertical terminal slots 248. With respect to all the foregoing elements, FIGS. 17 and 18 show the junction block assembly 200 in accordance with the invention, in perspective views and in a fully assembled state.

For purposes of security and safety, the vertical junction block terminal housing 244 can be constructed with a series of "keys" which essentially comprise physical structure which prohibit electrical and mechanical interconnection of the vertical junction block terminal housing 244 to an external cable assembly connector, other than one having a "matching" set of keys. In this manner, incompatible cable assembly connectors are prohibited from being connected to the vertical junction block terminal housing 244. It should be noted that although not expressly described herein, similar types of keys can also be utilized for the horizontal junction block terminal housing 242.

Figure 19:
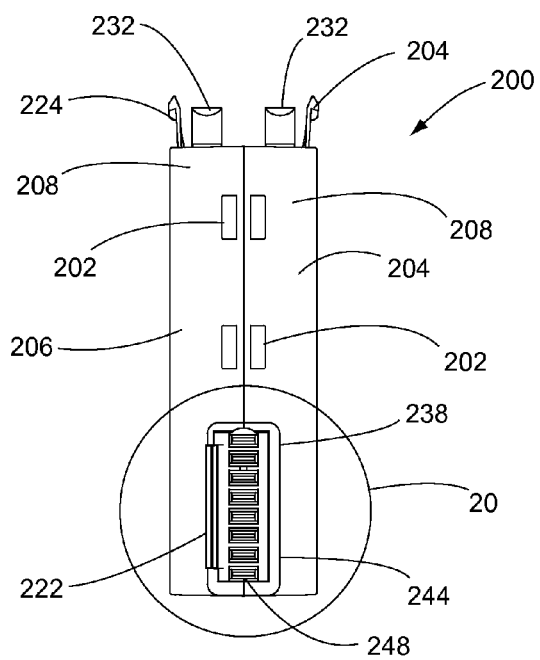
FIG. 19 is a plan view of the junction block assembly shown in FIG. 9, the view being similar to the view of FIG. 10.
Figure 20:
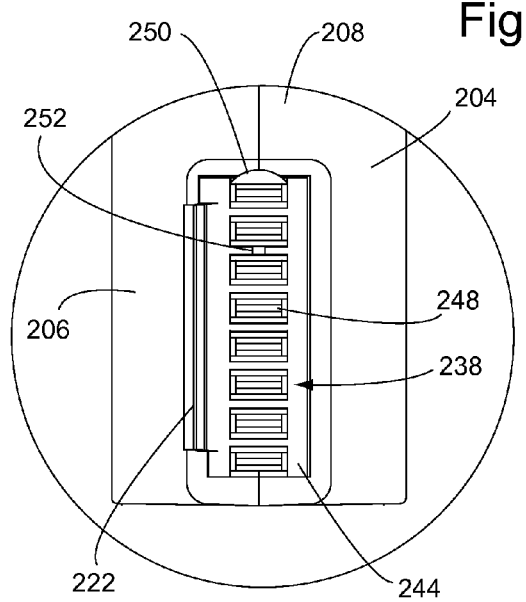
FIG. 20 is an enlarged view looking into the vertical junction block connector of the junction block assembly shown in FIG. 9, with the enlarged view corresponding to the section of FIG. 19 identified by circle 20.

The concepts associated with the keying arrangements are illustrated in FIGS. 19-25. FIG. 19 and FIG. 20 illustrate a vertical junction block terminal housing 244 having a particular key configuration. As earlier stated, the junction block assembly 200 includes a series of horizontal terminal slots 246, and a series of vertical terminal slots 248. With reference to FIGS. 19 and 20, the vertical junction block terminal housing 244 includes an upper key 250 which is essentially formed at the top of the uppermost vertical terminal slot 248. The upper key, in this particular instance, is formed with an upper surface having an upwardly concave shape. An intermediate key 252 is also provided. The intermediate key 252 consists of a projecting stub 252 located between the second and third vertical terminal slots 248, with the first terminal slot being considered the uppermost terminal slot 248.

Figure 21:
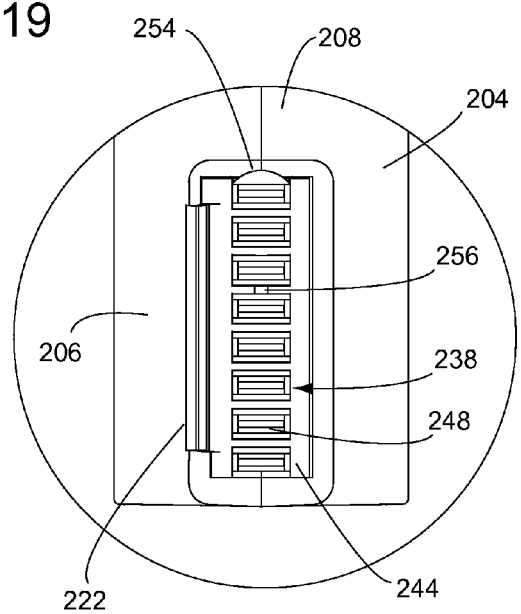
FIG. 21 is an enlarged view of an alternative embodiment of a vertical junction block connector, similar to FIG. 20, but having a differing keying arrangement from the keying arrangement of the connection block connector shown in FIG. 20.

FIG. 21 illustrates an alternative keying arrangement for the vertical junction block terminal housing 244. Specifically, FIG. 21 includes a second upper key 254. In this particular instance, the second upper key 254 has substantially the same shape as the upper key 250 shown in FIG. 20. However, the housing 244 of FIG. 21 includes a second intermediate key 256 positioned differently from the intermediate key 252 of FIG. 20. Specifically, the second intermediate key 256 is formed as a stub located between the third and fourth vertical terminal slots 248, counting from the top.

Figure 22:
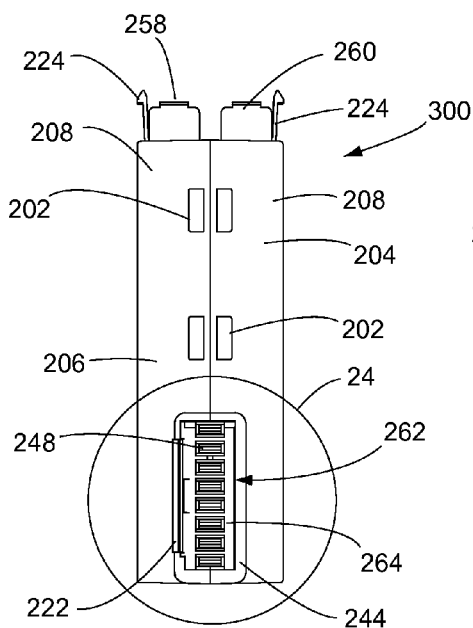
FIG. 22 is a plan view of a junction block assembly substantially corresponding to that shown in FIG. 9, but with a differing keying arrangement for the vertical junction block connector.
Figure 24:
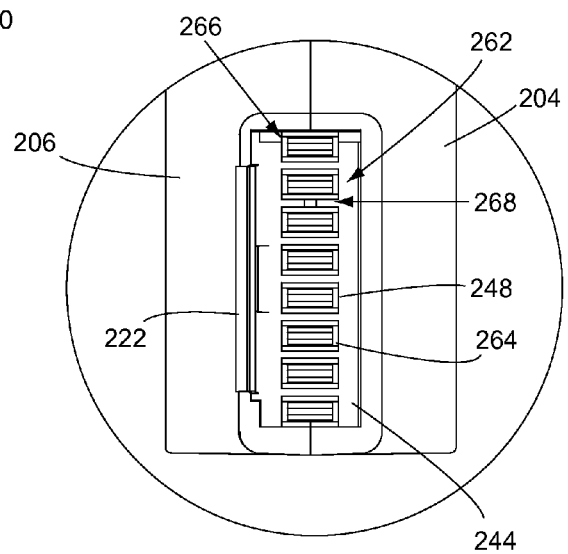
FIG. 24 is an enlarged view of the vertical junction block connector similar to that shown in FIG. 23, but specifically showing the keying arrangement which is also illustrated in FIG. 22, with FIG. 24 corresponding to the section of FIG. 22 identified by circle 24.
Figure 23:
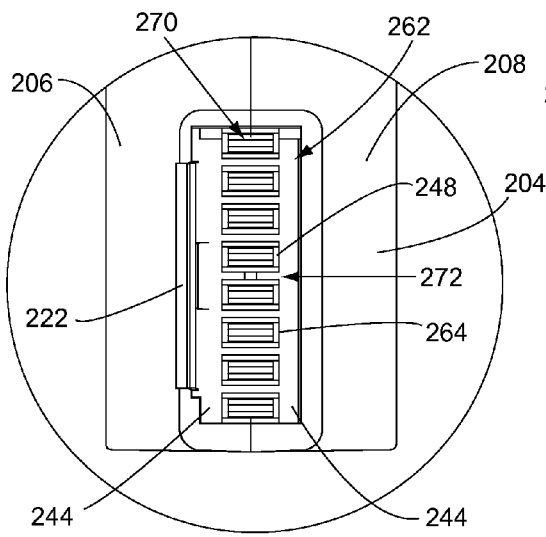
FIG. 23 is an enlarged view of the vertical junction block connector shown in FIG. 22, but showing an alternative keying arrangement for the connector terminals.

FIG. 22 illustrates a somewhat different configuration, with the horizontal electrical connection being formed as first male terminal set 258 and second male terminal set 260. Correspondingly, the vertical connections are shown as being formed by a vertical male terminal set 262, with corresponding vertical male terminals 264. Further, as shown in the enlarged view of FIG. 24, the vertical junction block terminal housing 244 includes a third upper key 266 having the configuration of a pair of outwardly projecting tabs on each side of the uppermost vertical terminal slot 248. Further, FIG. 24 illustrates a third intermediate key 268 located between the second and third vertical terminal slot 248. Correspondingly, FIG. 23 includes a fourth upper key 270, substantially corresponding to the third upper key 266. However, the fourth intermediate key 272 is located between the fourth and fifth vertical terminal slot 248.

Figure 25:
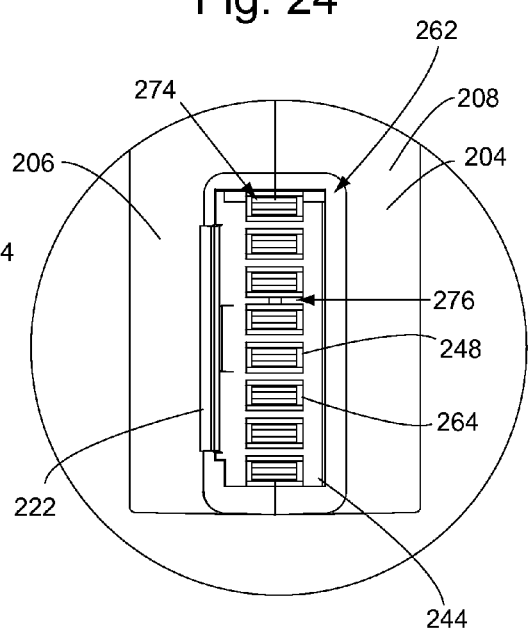
FIG. 25 is an enlarged view of the vertical junction block connector similar to that of FIG. 24, but showing a still further embodiment of a keying arrangement for the vertical junction block connector.

Still further, FIG. 25 illustrates a further alternative keying arrangement for the vertical junction block terminal housing 244. Specifically, FIG. 25 illustrate a fifth upper key 274, substantially corresponding to the fourth upper key 270 of FIG. 23. However, the fifth intermediate key 276 shown in FIG. 25 differs from the fourth intermediate key 272. Specifically, the fifth intermediate key 256 is a stub located between the third and fourth vertical terminal slots 248.

Figure 26:
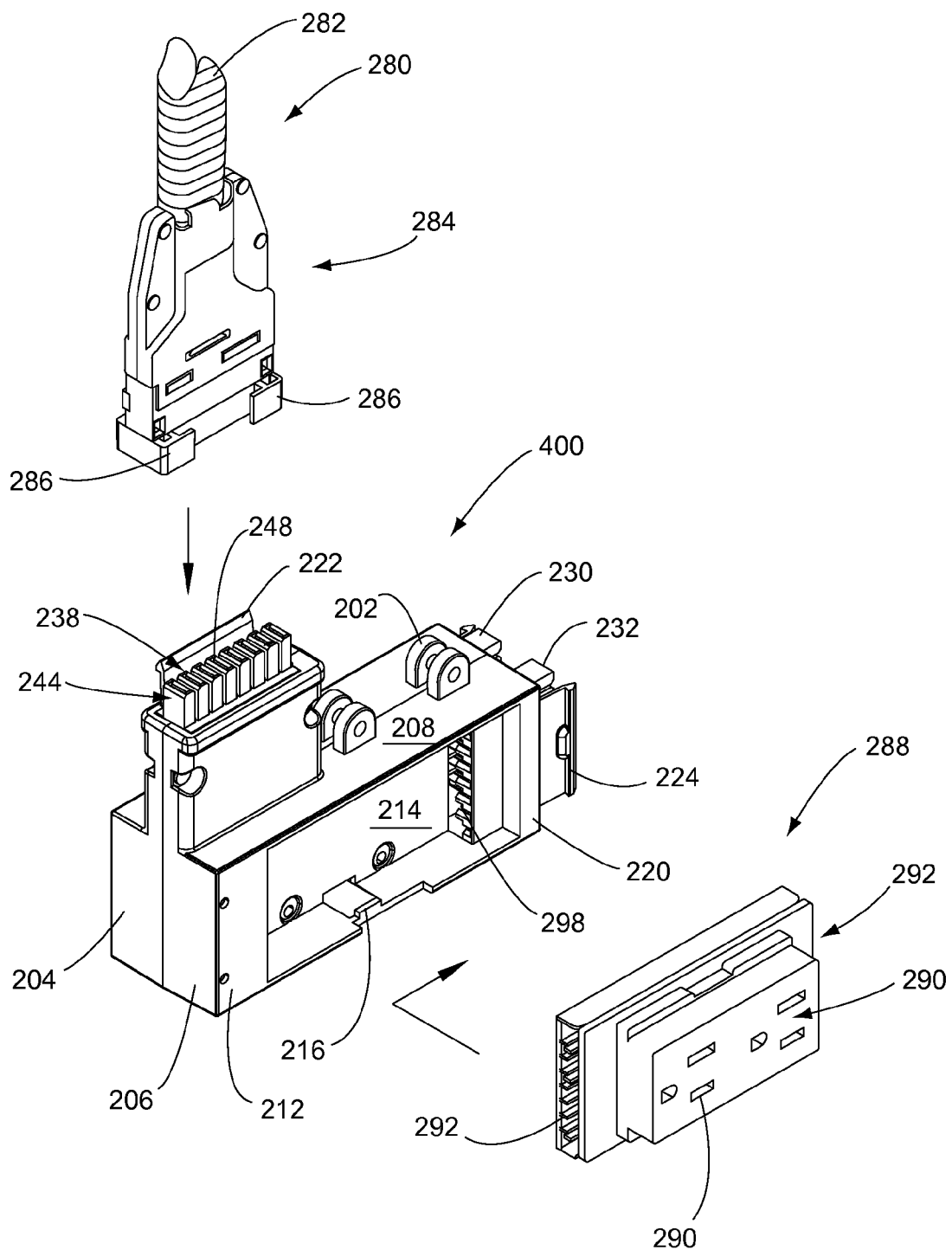
FIG. 26 is a perspective view and a partially exploded view of the vertical junction block connector shown in FIG. 9, and showing a partial view of a vertical cable assembly having a cable connector adapted to connect to the vertical junction block connector, and further showing the relative positioning of a receptacle block to be inserted and electrically connected to the vertical junction block assembly.
Figure 27:
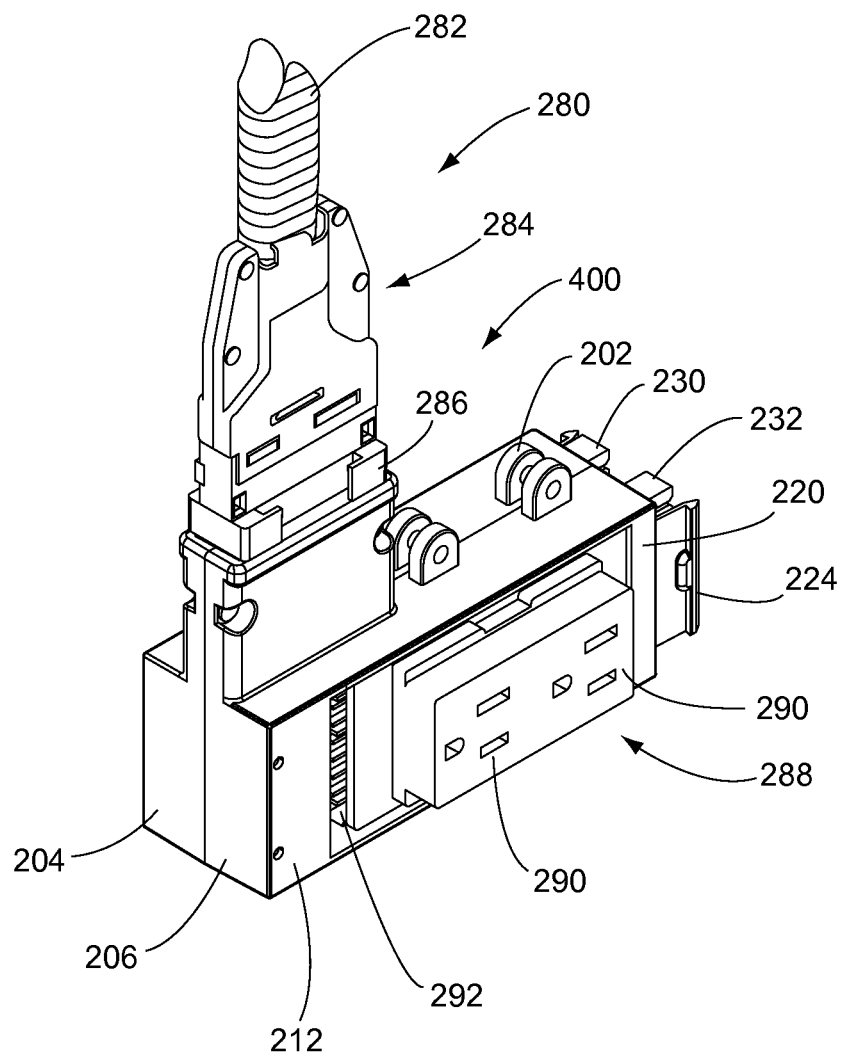
FIG. 27 is a perspective view of the fully assembled junction block assembly, vertical cable assembly and receptacle block shown in FIG. 26.

FIGS. 26 and 27 illustrate the relative positioning and assembly of the vertical junction block assembly 200 with a receptacle block and a vertical cable assembly. Specifically, FIG. 26 illustrated an exploded view, and FIG. 27 illustrates a fully assembled view. With reference thereto, a vertical cable assembly 280 is shown in a position to be mechanically and electrically connected to the vertical female terminal set 238 of the vertical junction block assembly 400. The vertical cable assembly 280 includes a vertical cable 282, connected to a vertical cable connector 284. The cable connector 284 includes a pair of connecting tabs 286 which are utilized to receive the vertical latch 222 so as to secure the vertical cable assembly 280 in a releasable manner to the vertical junction block terminal housing 244.

Also as shown in FIGS. 26 and 27 is a receptacle block 288. The receptacle block 288 is known in the art and has been substantially, previously described herein. The receptacle block 288 includes a pair of three-prong receptacles 290. Extending outwardly from opposing ends of the receptacle bock 288 are receptacle block male terminal groups 292. The receptacle block male terminal groups 292 are adapted to be electrically connected to the junction block receptacle terminal groups 298.

Figure 28:
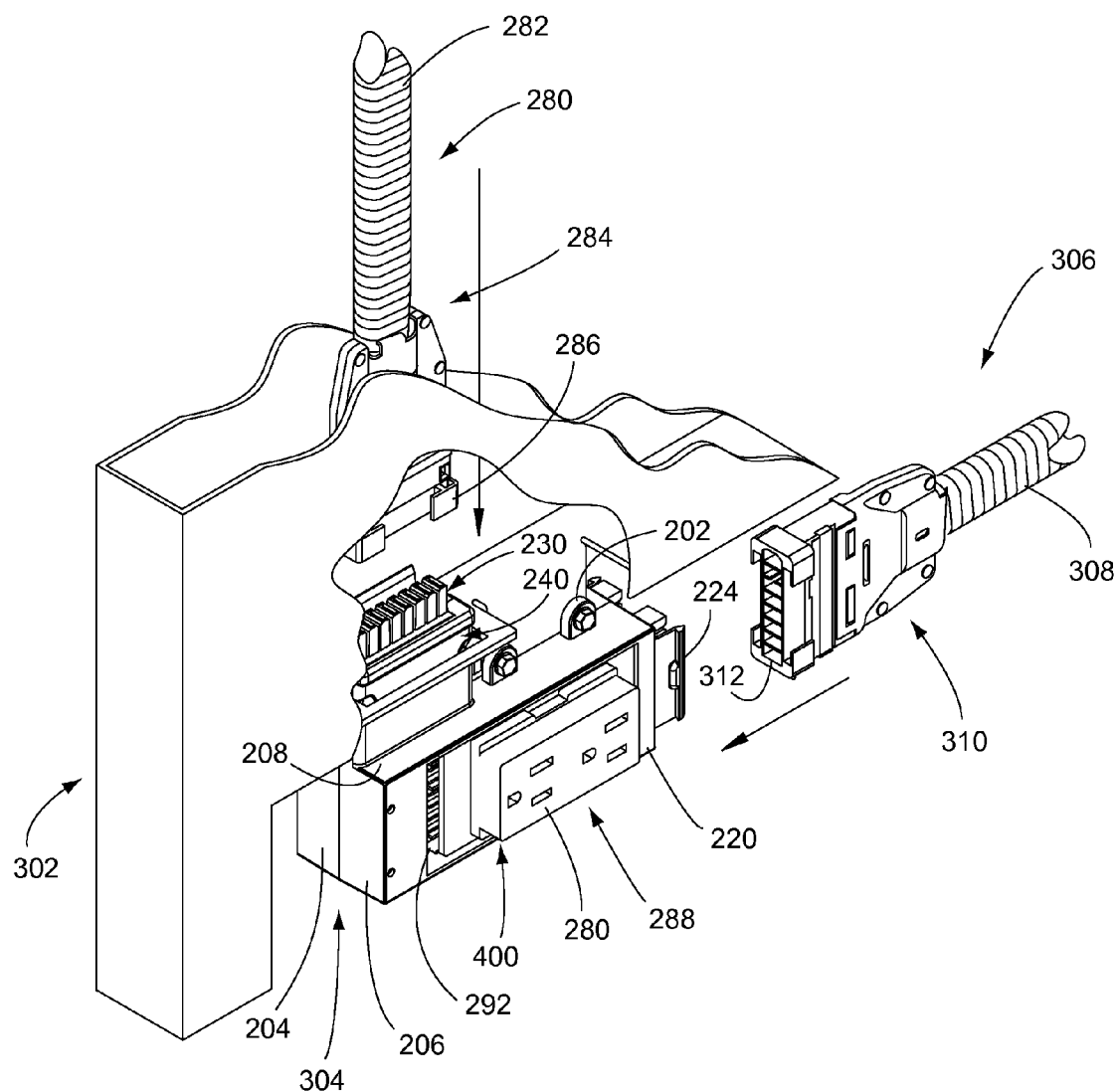
FIG. 28 is a perspective and partially exploded view of the junction block assembly shown in FIG. 9, with the receptacle block of FIG. 26 electrically connected thereto, and showing the relative positioning of the vertical cable assembly and a horizontal cable assembly for connection to the vertical junction connector and horizontal junction block connector, respectively, of the vertical junction block assembly.

FIG. 28 illustrates the vertical junction block assembly 200, vertical cable assembly 280 and receptacle block 288 in a partially assembled state within an office panel 302. The office panel 302 includes a raceway 304. Also as shown in FIG. 28 is a horizontal cable assembly 306 having a horizontal cable 308 and a horizontal cable connector 310. The horizontal cable connector 310 includes a horizontal cable connector terminal group 312. The horizontal cable connector terminal group 312 is adapted to mechanically and electrically connect to either the first female terminal set 230 or second horizontal female terminal set 232, for purposes of electrical connection to the receptacle block 288.

Figure 29:
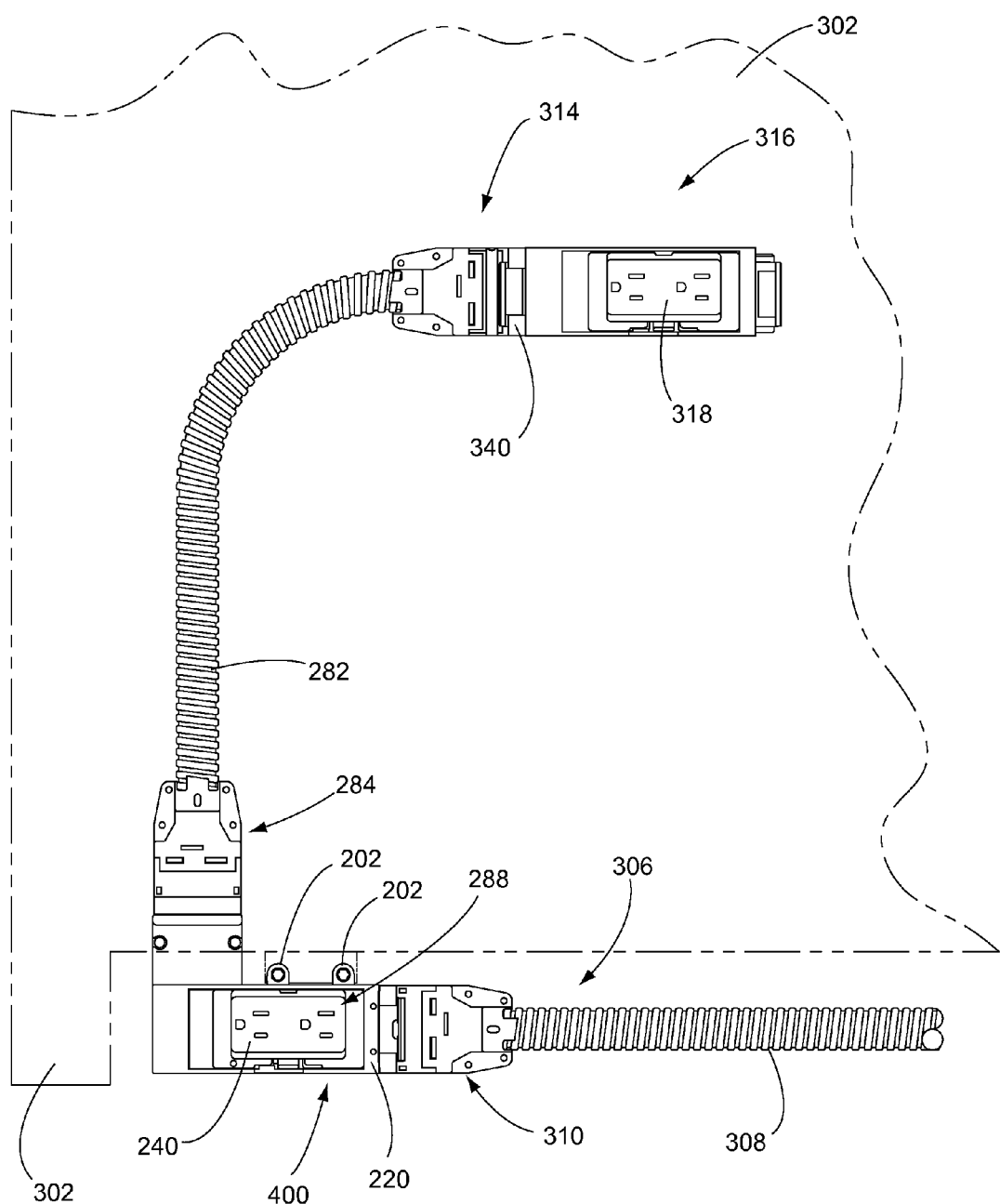
FIG. 29 is a front-elevation view of a par distribution system as positioned within the raceway, and having a vertical injunction block assembly, horizontal cable assembly, and vertical cable assembly, with a conventional junction block assembly connected to an opposing cable connector of the vertical cable assembly.

FIG. 29 substantially shows the overall power distribution system shown in FIG. 28. However, the other end of the vertical cable assembly 280 includes a further or a second cable connector 314 connected to the vertical cable 282 at an opposing end thereof. The second cable connector 314 is connected to a conventional junction block assembly 316, corresponding to junction block assemblies previously described herein. The junction block assembly 316 is connected to the cable connector 314 through junction block terminals 320. Also shown with the conventional junction block assembly 316 is a conventional receptacle block 318.

It will be apparent to those skilled in the pertinent arts that still other embodiments of vertical junction block assemblies in accordance with the invention can be designed. That is, the principles of a junction block assembly in accordance with the invention are not limited to the specific embodiments described herein. Accordingly, it will be apparent to those skilled in the art that modifications and other variations of the above-described illustrative embodiments of the invention may be effected without departing from the spirit and scope of the novel concepts of the invention.

The invention claimed is:

1. A junction block assembly for use with a power distribution system for carrying electrical power and for providing electrical devices external to said junction block assembly with access to said electrical power, said junction block assembly comprising:
   at least one junction block having an elongated housing;
   an internal wiring assembly;
   at least a first horizontal terminal group connected to said internal wiring assembly and horizontally disposed for releasably connecting said internal wiring assembly to a source of electrical power;
   a vertically disposed housing extending upwardly from a main body of said junction block, said vertically disposed housing having at least a first vertical terminal group extending vertically upward and electrically connected to said first horizontal terminal group through said internal wiring assembly; and
   at least one electrical receptacle block, said electrical receptacle block having a first receptacle block terminal group mechanically and releasably connectable to said junction block and electrically connectable to said first horizontal terminal group.

2. A junction block assembly in accordance with claim 1, characterized in that a vertical latch is provided for securing a connector assembly to said vertical terminal housing.

3. A junction block assembly in accordance with claim 2, characterized in that said junction block assembly further comprises a pair of horizontal latches, said horizontal latches utilized to releasably and mechanically secure a horizontal cable assembly connector to said horizontal terminal housing.

4. A junction block assembly in accordance with claim 1, characterized in that said internal wiring assembly is utilized to electrically transmit power between said first horizontal terminal group and said first vertical terminal group.

5. A junction block assembly in accordance with claim 1, characterized in that said internal wiring assembly is further utilized to selectively transmit power from external sources to said at least one receptacle block.

6. A junction block assembly in accordance with claim 1, characterized in that said internal wiring assembly and said first horizontal terminal group comprises a series of H-connectors, forming a horizontal female terminal group with a first female terminal set and a second female terminal set.

7. A junction block assembly in accordance with claim 6, characterized in that extending inwardly is part of said first female terminal set as a junction block receptacle terminal group, consisting of female terminals.

8. A junction block assembly in accordance with claim 7, characterized in that another junction block receptacle terminal group extends inwardly from said first female terminal set, and said junction block receptacle terminal group is positioned so as to receive a corresponding male terminal groups of said receptacle block.

9. A junction block assembly in accordance with claim 1, characterized in that said assembly further includes a horizontal junction block terminal housing, utilized to house said horizontal female terminal group.

10. A junction block assembly in accordance with claim 7, characterized in that said horizontal terminal housing includes a set of horizontal terminal slots, while said vertical terminal housing includes a set of vertical terminal slots.

11. A junction block assembly in accordance with claim 1, characterized in that said horizontal terminal housing is constructed with at least one key which prohibits electrical and mechanical interconnection of said horizontal terminal housing to a mismatched external connector assembly.

12. A junction block assembly in accordance with claim 1, characterized in that said vertical terminal housing is constructed with at least one key which prohibits electrical and mechanical interconnection of said vertical terminal housing to a mismatched external connector assembly.

13. A junction block assembly in accordance with claim 1, characterized in that:
   said junction block has at least one side forming a recessed receptacle block region;
   said receptacle block is mechanically received within said junction block region, so as to be selectively releasable from said junction block;
   said internal wiring assembly comprises a series of H-connectors, forming a horizontal female terminal group with a first female terminal set, and a second female terminal set; and
   said first and said second female terminal sets extend at least partially into said receptacle block region and are electrically connectable to said receptacle block.

* * * * *

UNITED STATES PATENT AND TRADEMARK OFFICE
CERTIFICATE OF CORRECTION

| | | |
|---|---|---|
| PATENT NO. | : 8,801,445 B2 | Page 1 of 1 |
| APPLICATION NO. | : 12/834452 | |
| DATED | : August 12, 2014 | |
| INVENTOR(S) | : Norman R. Byrne | |

It is certified that error appears in the above-identified patent and that said Letters Patent is hereby corrected as shown below:

In the Claims

Column 16, Claim 8, line 25: "groups" should be --group--

Signed and Sealed this
Sixth Day of January, 2015

Michelle K. Lee
*Deputy Director of the United States Patent and Trademark Office*